(12) United States Patent
Xue et al.

(10) Patent No.: US 9,282,195 B2
(45) Date of Patent: Mar. 8, 2016

(54) ECHO CANCELLER AND ECHO CANCELLATION METHOD

(75) Inventors: Tao Xue, Shenzhen (CN); Tao Sun, Shenzhen (CN); Dongmei Liu, Shenzhen (CN); Jinjun Wang, Shenzhen (CN); Qi Zhang, Shenzhen (CN); Xia Wang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 37 days.

(21) Appl. No.: 14/368,953

(22) PCT Filed: Mar. 15, 2012

(86) PCT No.: PCT/CN2012/072395
§ 371 (c)(1),
(2), (4) Date: Jun. 26, 2014

(87) PCT Pub. No.: WO2013/097357
PCT Pub. Date: Jul. 4, 2013

(65) Prior Publication Data
US 2014/0329568 A1  Nov. 6, 2014

(30) Foreign Application Priority Data

Dec. 26, 2011 (CN) .......................... 2011 1 0442191

(51) Int. Cl.
*H04M 1/00* (2006.01)
*H04M 9/08* (2006.01)
*G10K 11/16* (2006.01)

(52) U.S. Cl.
CPC .............. *H04M 9/082* (2013.01); *G10K 11/16* (2013.01)

(58) Field of Classification Search
USPC ........................................................ 455/570
See application file for complete search history.

(56) References Cited

U.S. PATENT DOCUMENTS

| 6,035,034 | A | 3/2000 | Trump |
| 6,947,552 | B2 | 9/2005 | Takada |

(Continued)

FOREIGN PATENT DOCUMENTS

| CN | 1494229 | 5/2004 |
| CN | 101087320 | 12/2007 |
| CN | 101826328 | 9/2010 |
| FR | 2952263 | 5/2011 |

OTHER PUBLICATIONS

International Search Report for PCT/CN2012/072395, English translation attached to original, Both completed by the Chinese Patent Office on Aug. 16, 2012, All together 5 Pages.

(Continued)

*Primary Examiner* — Joel Ajayi
(74) *Attorney, Agent, or Firm* — Brooks Kushman P.C.

(57) ABSTRACT

An echo canceller and an echo cancellation method are provided. The echo canceller includes a self-adaptive filter, a voice signal detection portion and a path change detection portion; a far-end voice signal is propagated in an echo path through a speaker and is picked up by a microphone to form an echo signal. The self-adaptive filter is configured to receive the far-end voice signal as a training signal to simulate the echo path, and cancel the echo signal in a near-end signal. The voice signal detection portion is configured to detect a communication status, control the self-adaptive filter according to the communication status, and control startup of the path change detection portion according to the communication status. The path change detection portion is configured to detect whether a change occurs on the echo path, and control the self-adaptive filter according to whether the change occurs on the echo path.

14 Claims, 4 Drawing Sheets

(56) References Cited

U.S. PATENT DOCUMENTS

| | | |
|---|---|---|
| 7,817,797 B2 | 10/2010 | Popovic et al. |
| 2004/0086109 A1 | 5/2004 | Takada |
| 2007/0206777 A1 | 9/2007 | Fadili et al. |
| 2012/0213380 A1 | 8/2012 | Mahe et al. |

OTHER PUBLICATIONS

Extended European Search Report for European Application No. 12863916.8, Completed by the European Patent Office, Dated May 11, 2015, 5 Pages.

ECHO CANCELLER AND ECHO CANCELLATION METHOD

CROSS-REFERENCE TO RELATED APPLICATIONS

This application is the U.S. national phase of PCT Appln. No. PCT/CN2012/072395 filed Mar. 15, 2012 which claims priority to Chinese Application No. 201110442191.3 filed Dec. 26, 2011, the disclosures of which are incorporated in their entirety by reference herein.

TECHNICAL FIELD

The present document relates to a method for canceling the acoustics echo in the mobile communication field, in particular, to an echo canceller and an echo cancellation method.

BACKGROUND OF THE RELATED ART

With the rapid development of the wireless communication technology, people puts forward higher requirement on the quality and the comfortableness of voice communication, in which, the comfortable and natural hands free communication environment is becoming the increasing demand of people. However, the existence of echoes influences the communication quality, and may make the communication system be unable to work normally when being serious. So, an effective measure must be taken to suppress the echo and eliminate its influence, thereby improving the quality of the voice communication.

An echo canceller generally adopts a self-adaptive echo cancellation method. The self-adaptive filter generates, through identifying an impact response to an acoustic feedback channel, a signal that is same with an echo, and then subtracts the echo signal from a mixed signal of a near-end voice and the echo, to achieve the purpose of the echo cancellation. In this way, it not only can guarantee that the influence on the voice quality is minimum, but also obtains maximum suppression on the echo. The greatest characteristic of the self-adaptive echo cancellation technology is that: it does not limit space in which the acoustic feedback channel locates, that is, regardless of the internal space size, regardless of its internal furnishings, and regardless of the position in which the speaker is, it tracks the change of the acoustics characteristic in the room automatically and suppress to the maximum extent the echo and even howling caused by the acoustic feedback. Thus, it is the key for the acoustic echo cancellation to rapidly and automatically identify and track the characteristic of the acoustic feedback of the LRM system channel in a cockpit or room.

However, in the case of real communication, there are some phenomena, such as, double-talk and path mutation, and these phenomena all influence the convergence performance of the self-adaptive filter, resulting in the echo not be able to be canceled effectively. The performance merits of a path change detection module and a double-end detection module in the echo canceller directly influence the effects of the echo suppression. When a double-talk mode is detected, it is needed to control the self-adaptive filter to stop the coefficient update, otherwise, the uprush of error signals causes the self-adaptive filter to be divergent; and it is needed to restart the filter during the path mutation, so as to track rapidly the path changes and eliminate the echo better.

The traditional double-end detection module generally adopts a Geigel method and a correlation detection method. The complexity of the Geigel method is low and it is easy to be realized, but the determination of a threshold is very difficult, and the effect under the noise environment is relatively bad; while the correlation detection method mainly relies on detections of the near-end and far-end voices, which causes the performance of the filter to worsen when the noise is larger or the path is mutated.

The traditional path detection module adopts a structure of master-slave filters, and the added slave filter is generally a window with a total length of 128 ms, and is used for covering the whole echo path; however, the cost and complexity of this method are both very high. At the same time, after the path is changed, the echo changes as well, which makes the performance of the double-end detection method, of which the original performance is good, worsen due to threshold failure.

CONTENT OF THE INVENTION

The technical problem solved by the present document is to provide an echo canceller and an echo cancellation method, which can reach very good convergence effect and double-end communication effect at the initialization stage.

In order to solve the above-mentioned technical problem, the present document adopts the following technical scheme:

an echo canceller comprises: a self-adaptive filter, a voice signal detection portion and a path change detection portion, wherein, a far-end voice signal is propagated in an echo path through a speaker and is picked up by a microphone to form an echo signal, wherein, the self-adaptive filter is configured to receive the far-end voice signal as a training signal to simulate the echo path, and cancel the echo signal in a near-end signal;

the voice signal detection portion is configured to: detect a communication status, control the self-adaptive filter according to the communication status, and control startup of the path change detection portion according to the communication status; and the path change detection portion is configured to: detect whether a change occurs on the echo path, and control the self-adaptive filter according to whether the change occurs on the echo path.

Wherein, an initial coefficient of the self-adaptive filter is 0.

The echo canceller further comprises a random sequence sending portion, wherein, the random sequence sending portion is configured to: send a random sequence to the speaker when establishing a communication link, wherein the random sequence passes through the echo path and the microphone to form the echo signal and the echo signal is transmitted to the self-adaptive filter, so as to perform initialization to the self-adaptive filter; and the self-adaptive filter is configured to: train by adopting the echo signal formed by the random sequence, and store a coefficient obtained from training as an initial coefficient.

Wherein, the random sequence and the voice signal are uncorrelated.

Wherein, the voice signal detection portion comprises a detection threshold initialization unit, a near-end voice judgment unit, a far-end voice judgment unit and a control signal sending unit, wherein:

the detection threshold initialization unit is configured to: store the near-end signal when establishing the communication link, and estimate an initial value of a voice detection threshold by adopting the stored near-end signal, wherein the initial value is as an initial value of a near-end voice detection threshold of the near-end voice judgment unit and an initial value of a far-end voice detection threshold of the far-end voice judgment unit;

the near-end voice judgment unit is configured to: judge whether there is a near-end voice signal, and input a result of a near-end voice judging into the control signal sending unit;

the far-end voice judgment unit is configured to: judge whether there is a far-end voice signal, and input a result of a far-end voice judging into the control signal sending unit; and the control signal sending unit is configured to: send a control signal to control the self-adaptive filter and the path change detection portion after receiving the result of the near-end voice judging and the result of the far-end voice judging.

Wherein, the control signal send unit is configured to send the control signal to control the self-adaptive filter and the path change detection portion according to the following way:

closing the self-adaptive filter during a near-end communication or muting;

locking the self-adaptive filter during a double-end communication, which is equivalent to not updating coefficients of the self-adaptive filter;

starting the path change detection portion during non near-end communication, non-muting, and non double-end communication.

Wherein, the detection threshold initialization unit is configured to estimate the initial value of the voice detection threshold according to the following way:

calculating the initial value of the voice detection threshold by adopting Threshold0=K·E(v²), wherein, Threshold0 is the initial value of the voice detection threshold, K is a voice threshold estimation gain, $$E(v^2) = \frac{1}{N}\sum_{i=1}^{N} v(n)^2,$$

v(n) is the near-end signal, and N is a signal length.

Wherein, the near-end voice judgment unit is configured to judge whether there is a near-end voice signal according to the following way:

adding 1 to a counter C(n) when d1(n)²>Threshold, and judging that there is the near-end voice signal in the near-end signal when $$SUMC = \sum_{i=M}^{M+N_1-1} C(i) > Threshold2,$$

wherein, d1(n) is a convolution of coefficients of the first L orders of the self-adaptive filter and the far-end voice signal, the Threshold is a first near-end voice detection threshold, and the Threshold2 is a second near-end voice detection threshold, $N_1$ is a length of a sliding window, M=M+S, wherein M is a starting point of the sliding window and S is a sliding length of the sliding window; or, adding 1 to the counter C(n) when $$\sum_{i=1}^{N_3} d(i)^2 > Threshold,$$

and judging that there is the near-end voice signal in the near-end signal when $$SUMC = \sum_{i=M}^{M+N_1-1} C(i) > Threshold2,$$

wherein, d(n) is the near-end signal, $N_3$ is a frame length, the Threshold is the first near-end voice detection threshold, and the Threshold2 is the second near-end voice detection threshold, $N_1$ is a length of the sliding window, M=M+S, wherein M is the starting point of the sliding window and S is the sliding length of the sliding window;

the far-end voice judgment unit is configured to judge whether there is a far-end voice signal according to the following way:

adding 1 to a counter D(n) when x(n)²>Threshold1, and judging that there is the far-end voice signal in the far-end signal when $$SUMD = \sum_{i=M}^{M+N_2-1} D(i) > Threshold3,$$

wherein, the Threshold1 is a first far-end voice detection threshold, the Threshold3 is a second far-end voice detection threshold, and $N_2$ is a length of a sliding window.

Wherein, the first near-end voice detection threshold is equal to the first far-end voice detection threshold, and the second near-end voice detection threshold is equal to the second far-end voice detection threshold.

Wherein, the voice signal detection portion further comprises a correlation calculation unit and a threshold change control unit, wherein:

the correlation calculation unit is configured to: receive a path change detection result sent by the path change detection portion, calculate a correlation of the near-end signal and the far-end voice signal when the echo path changes, determine that there is no near-end voice signal in the near-end signal when the correlation is greater than a correlation comparison threshold, and check a judgment result of the near-end voice judgment unit, and determine that the first near-end voice detection threshold is invalid when the judgment result is that the near-end voice signal exists; and the threshold change control unit is configured to: when the first near-end voice detection threshold is invalid, re-calculate the near-end voice detection threshold, and send a control signal to the near-end voice judgment unit to change the near-end voice detection threshold.

Wherein, the threshold change control unit is configured to re-calculate the near-end voice detection threshold according to the following way:

judging whether $$r = \frac{E[d(n)x(n)]}{\sqrt{\delta_d^2 \delta_x^2}} > Threshold5 \ \&\& \ SUMC$$

$$= \sum_{i=1}^{N_1} C(i) > Threshold2$$

exist; if yes, then determining Threshold=$G_1$·E(d²), wherein, the Threshold is the first near-end voice detection threshold, the Threshold5 is the correlation comparison threshold, δ is a signal variance, and $G_1$ is a voice threshold estimation gain.

Wherein, the path change detection portion comprises: a second self-adaptive filter, a self-adaptive filter performance calculation unit, a second self-adaptive filter performance calculation unit and a performance comparison unit, wherein:

an input signal of the second self-adaptive filter is the far-end voice signal, a desired signal is a value obtained by the convolution of the coefficients of the first L orders of the self-adaptive filter and the far-end voice signal, and an error signal is an error signal of the convolution, the second self-adaptive filter is configured to: simulate the first L coefficients of the echo path;

the self-adaptive filter performance calculation unit is configured to: calculate performance of the self-adaptive filter, and send a result to the performance comparison unit;

the second self-adaptive filter performance calculation unit is configured to: calculate performance of the second self-adaptive filter, and send a result to the performance comparison unit; and the performance comparison unit is configured to: receive the results sent by the self-adaptive filter performance calculation unit and the second self-adaptive filter performance calculation unit, and then judge whether a path mutation occurs, restart the self-adaptive filter when determining that the path mutation occurs, and open a correlation calculation unit of the voice signal detection portion at the same time; and update the self-adaptive filter normally when determining that no path mutation occurs.

Wherein:

the self-adaptive filter performance calculation unit is configured to calculate the performance of the self-adaptive filter according to the following way: calculating the performance of the self-adaptive filter according to $$ERLE_2 = 10\log_{10}\frac{\sum d(n)^2}{\sum e(n)^2},$$

wherein, $ERLE_2$ is a performance value of the self-adaptive filter, $d(n)$ is the near-end signal, and $e(n)$ is an error signal of the near-end signal;

the second self-adaptive filter performance calculation unit is configured to calculate the performance of the second self-adaptive filter according to the following way: calculating the performance of the second self-adaptive filter according to $$ERLE_1 = 10\log_{10}\frac{\sum d1(n)^2}{\sum e1(n)^2},$$

wherein, $ERLE_1$ is a performance value of the second self-adaptive filter, $d1(n)$ is the convolution of coefficients of the first L orders of the second self-adaptive filter and the far-end voice signal, and $e1(n)$ is an error signal of the convolution; and the performance comparison unit is configured to judge whether the path mutation occurs according to the following way: receiving the performance values calculated by and obtained from the self-adaptive filter performance calculation unit and the second self-adaptive filter performance calculation unit, and judging whether $ERLE_1 - ERLE_2 > Threshold4$ exists, wherein, Threshold4 is a path mutation threshold; if yes, then determining that the echo path mutates.

An echo cancellation method comprises:

a far-end voice signal being propagated in an echo path through a speaker, and being picked up by a microphone to form an echo signal;

receiving, by a self-adaptive filter, the far-end voice signal as a training signal to simulate the echo path, and canceling the echo signal in a near-end signal;

detecting, by a voice signal detection portion, a communication status, controlling the self-adaptive filter according to the communication status, and controlling startup of a path change detection portion according to the communication status; and detecting, by the path change detection portion, whether a change occurs on the echo path, and controlling the self-adaptive filter according to whether the change occurs on the echo path.

The echo cancellation method further comprises: setting an initial coefficient of the self-adaptive filter as 0.

The echo cancellation method further comprises:

sending, by a random sequence sending portion, a random sequence to the speaker when establishing a communication link, wherein the random sequence passes through the echo path and the microphone to form the echo signal and the echo signal is transmitted to the self-adaptive filter, so as to perform initialization to the self-adaptive filter; and performing, by the self-adaptive filter, training by adopting the echo signal formed by the random sequence, and storing a coefficient obtained from the training as an initial coefficient.

Wherein, the step of detecting, by a voice signal detection portion a communication status, controlling the self-adaptive filter according to the communication status, and controlling startup of a path change detection portion according to the communication status comprises:

storing, by the voice signal detection portion, the near-end signal when establishing the communication link, and estimating an initial value of a voice detection threshold by adopting the stored near-end signal, wherein the initial value is as an initial value of a near-end voice detection threshold and an initial value of a far-end voice detection threshold;

judging, by the voice signal detection portion, whether there is a near-end voice signal and whether there is a far-end voice signal, and sending a control signal to control the self-adaptive filter and the path change detection portion.

Wherein, the step of the voice signal detection portion sending a control signal to control the self-adaptive filter and the path change detection portion comprises:

closing the self-adaptive filter during a near-end communication or muting;

locking the self-adaptive filter during a double-end communication, which is equivalent to not updating coefficients of the self-adaptive filter:

starting the path change detection portion during a non near-end communication, non-muting, and non double-end communication.

Wherein, the step of the voice signal detection portion estimating an initial value of a voice detection threshold by adopting the stored near-end signal comprises:

calculating, by the voice signal detection portion, the initial value of the voice detection threshold by adopting $Threshold0 = K \cdot E(v^2)$, wherein, Threshold0 is the initial value of the voice detection threshold, K is a voice threshold estimation gain, $$E(v^2) = \frac{1}{N} \sum_{i=1}^{N} v(n)^2,$$

v(n) is the near-end signal, and N is a signal length.

Wherein, the step of the voice signal detection portion judging whether there is a near-end voice signal comprises:
adding 1 to a counter C(n) when $d1(n)^2$>Threshold, and judging that there is the near-end voice signal in the near-end signal when $$SUMC = \sum_{i=M}^{M+N_1-1} C(i) > Threshold2,$$

wherein, d1(n) is a convolution of coefficients of the first L orders of the self-adaptive filter and the far-end voice signal, the Threshold is a first near-end voice detection threshold, and the Threshold2 is a second near-end voice detection threshold, $N_1$ is a length of a sliding window, M=M+S, wherein M is a starting point of the sliding window and S is a sliding length of the sliding window; or, adding 1 to the counter C(n) when $$\sum_{i=1}^{N_3} d(i)^2 > Threshold,$$

and judging that there is the near-end voice signal in the near-end signal when $$SUMC = \sum_{i=M}^{M+N_1-1} C(i) > Threshold2,$$

wherein, d(n) is the near-end signal, $N_3$ is a frame length, the Threshold is the first near-end voice detection threshold, and the Threshold2 is the second near-end voice detection threshold, $N_1$ is a length of the sliding window, M=M+S, wherein M is the starting point of the sliding window and S is the sliding length of the sliding window;

the step of the voice signal detection portion judging whether there is a far-end voice signal comprises: adding 1 to a counter D(n) when $x(n)^2$>Threshold1, and judging that there is the far-end voice signal in the far-end signal when $$SUMD = \sum_{i=M}^{M+N_2-1} D(i) > Threshold3,$$

wherein, the Threshold1 is a first far-end voice detection threshold, the Threshold3 is a second far-end voice detection threshold, and $N_2$ is a length of a sliding window.

Wherein, the first near-end voice detection threshold is equal to the first far-end voice detection threshold, and the second near-end voice detection threshold is equal to the second far-end voice detection threshold.

The echo cancellation method further comprises:
the voice signal detection portion receiving a path change detection result sent by the path change detection portion, calculating a correlation of the near-end signal and the far-end voice signal when the echo path changes, determining that there is no near-end voice signal in the near-end signal when the correlation is greater than a correlation comparison threshold, and checking a judgment result of whether there is a near-end voice signal, and determining that the first near-end voice detection threshold is invalid when the judgment result is that the near-end voice signal exists; and when the first near-end voice detection threshold is invalid, the voice signal detection portion re-calculating the near-end voice detection threshold, and sending a control signal to change the near-end voice detection threshold.

Wherein, the step of re-calculating the near-end voice detection threshold comprises: judging whether $$r = \frac{E[d(n)x(n)]}{\sqrt{\delta_d^2 \delta_x^2}} > Threshold5 \; \&\& \; SUMC = \sum_{i=1}^{N_1} C(i) > Threshold2$$

exist; if yes, then determining Threshold=$G_1 \cdot E(d^2)$, wherein, the Threshold is the first near-end voice detection threshold, the Threshold5 is the correlation comparison threshold, $\delta$ is a signal variance, and $G_1$ is a voice threshold estimation gain.

The echo cancellation method further comprises:
taking the far-end voice signal as an input signal of the second self-adaptive filter, taking a value obtained by the convolution of the coefficients of the first L orders of the self-adaptive filter and the far-end voice signal as a desired signal of the second self-adaptive filter, and taking an error signal of the convolution as an error signal of the second self-adaptive filter, and the second self-adaptive filter simulating the first L coefficients of the echo path;

calculating performance of the self-adaptive filter and performance of the second self-adaptive filter, and judging whether a path mutation occurs, restarting the self-adaptive filter when determining that the path mutation occurs, and starting a correlation calculation at the same time; and updating the self-adaptive filter normally when determining that no path mutation occurs.

Wherein:
the step of calculating the performance of the self-adaptive filter comprises: calculating the performance of the self-adaptive filter according to $$ERLE_2 = 10 \log_{10} \frac{\sum d(n)^2}{\sum e(n)^2},$$

wherein, ERLE2 is a performance value of the self-adaptive filter, d(n) is the near-end signal, and e(n) is an error signal of the near-end signal;

the step of calculating the performance of the second self-adaptive filter comprises: calculating the performance of the second self-adaptive filter according to $$ERLE_1 = 10 \log_{10} \frac{\sum d1(n)^2}{\sum e1(n)^2},$$

wherein, ERLE1 is a performance value of the second self-adaptive filter, d1(n) is the convolution of coefficients of the first L orders of the second self-adaptive filter and the far-end voice signal, and e1(n) is an error signal of the convolution; and the step of judging whether the path mutation occurs comprises: judging whether ERLE1−ERLE2>Threshold4 exists, wherein, Threshold4 is a path mutation threshold; if yes, then determining that the echo path mutates.

In summary, the present document, after adopting the above-mentioned technical scheme, can reach very good convergence effect at the initialization stage, and has a certain stability during the double-end communication; the random sequence has a prompt tone function and has very good practicability; it reduces the mutual influence between the double-end communication detection and the path mutation detection; and it improves the echo cancellation performance of an echo suppressor during the double-end communication and the path mutation.

PREFERRED EMBODIMENTS OF THE PRESENT INVENTION

Figure 1:
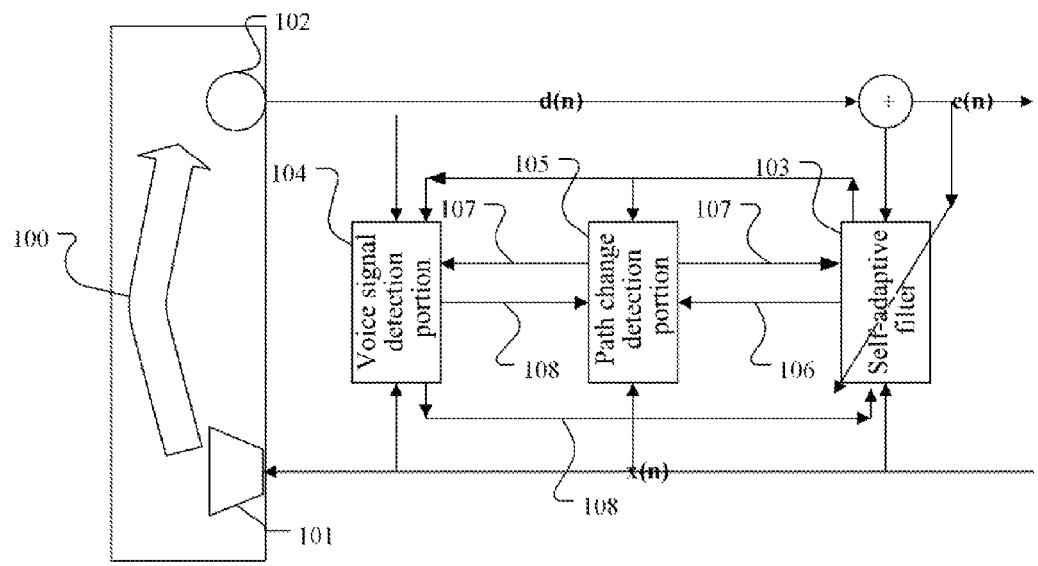
FIG. 1 is a structure diagram of an echo canceller of embodiment 1 of the present document.

A traditional echo canceller does not consider an initialization problem of a self-adaptive filter, which makes the performance of the self-adaptive filter is not good in an initial stage for echo suppression. The present embodiment, after establishing a communication link, uses transient muting resources to send a random sequence used for initializing the self-adaptive filter, and extracts environmental noises to estimate an initial threshold of voice detection. During the echo suppression, an initial coefficient of the self-adaptive filter is not set as a zero vector but replaced by a simulation value of an echo path, thus making the convergence of the self-adaptive filter be faster and the steady state error be less at the initialization stage. Sending the random sequence uncorrelated with the voice signal makes the self-adaptive filter itself have a certain robustness during an double-end communication. Meanwhile, the random sequence can remind users that the voice channel is already got through, which has very good practicability.

An echo canceller of the present embodiment includes: a self-adaptive filter, a random sequence sending portion, a voice signal detection portion and a path change detection portion, wherein:

the self-adaptive filter is configured to: cancel an echo signal from a near-end signal;

the random sequence sending portion is configured to: send a random sequence to initialize the self-adaptive filter;

the voice signal detection portion is configured to: judge a communication status through detecting the near-end voice and the far-end voice respectively, and control the self-adaptive filter according to the communication status; and the path change detection portion is configured to: perform a performance comparison to the self-adaptive filter and a second self-adaptive filter, judge whether a path change occurs, hereby controlling the self-adaptive filter, and meanwhile, update a voice detection threshold in the voice signal detection portion.

The echo cancellation method of the present embodiment includes the following steps:

in a first step: while the communication link is established, the random sequence sending portion sends the random sequence to train the self-adaptive filter, and the self-adaptive filter stores a coefficient received from training as an initial coefficient of the self-adaptive filter;

in a second step: the voice signal detection portion stores the near-end signal, estimate the voice detection threshold as an initial threshold according to the stored near-end signal, and performs a voice detection;

in a third step: the voice signal detection portion controls the self-adaptive filter according to different results of the voice detection, which includes: during a near-end communication or muting, closing the self-adaptive filter; locking the self-adaptive filter during a double-end communication; detecting by the path change detection portion whether a path mutation occurs when there is no the above-mentioned status, restarting the self-adaptive filter when the path mutation occurs, and adjusting a near-end voice detection threshold by the voice signal detection portion at the same time; updating the self-adaptive filter normally when the path mutation does not occur.

After the echo canceller finishes the above three steps, it is jumped to the second step to run by looping.

The present embodiment adopts the voice detection method based on a voice energy estimation, and the method uses a desired signal of the second self-adaptive filter to perform a double-end communication detection. The second self-adaptive filter can be easier to distinguish an echo and a near-end voice because its order is smaller, so a detection result which is more accurate than that of the self-adaptive filter can be obtained. It is judged as the double-end communication when both the far-end communication and the near-end communication are performed at the same time. However, regarding misjudgment of the near-end voice on each point which is caused by unbalanced loudnesses when detecting the near-end voice, the present embodiment, according to the characteristic that the voice points appear continuously, judges whether there is the near-end voice in a single point, adds the voice point into a sliding window after judging, and judges that the near-end voice exists when the near-end voice point in the window exceeds a threshold value, which improves the accuracy of the voice detection.

People regulate speak loudness according to the situation of noises when making a call in a noise environment, thus the voice signal detection portion can set the initial threshold of the voice detection according to a preliminary estimation of the noises.

The path change detection portion utilizes the performance difference of the second self-adaptive filter and the self-adaptive filter to judge whether the patch change occurs, wherein, the desired signal of the second self-adaptive filter is obtained by the coefficients of the self-adaptive filter and the far-end voice signal. Because the second self-adaptive filter simulates the first several orders of coefficients of the echo path, it can reach a very good convergence effect, and it can judge the changing of the path more clearly after the path changes.

After the path changes, the energy of the echo changes as well, and in the present embodiment the near-end voice detection threshold is automatically adjusted after the path changes: when a correlation of a receiving signal and a far-end voice signal is greater than a threshold, thus there is no near-end voice during a correlation detection, and meanwhile, if appearance of the near-end voice can be detected according to the original threshold, then the threshold should be updated. The new threshold is obtained with the help of the estimation of the near-end signal energy and a given gain, and it stops until two detection results are consistent. The present embodiment improves the accuracy of the voice detection, reduces mutual influence of the path detection and the double-end detection, and improves the robustness of the echo canceller.

The present embodiment is described in detail in combination with the accompanying drawings.

Embodiment 1

FIG. 1 is a structure diagram of the echo canceller of the present embodiment. The echo canceller includes: a speaker 101, a microphone 102, a self-adaptive filter 103, a voice signal detection portion 104 and a path change detection portion 105. In FIG. 1, x(n) is a far-end voice signal, d(n) is a receiving signal (near-end signal), e(n) is an error signal, and n represents time. The receiving signal includes one or more of a near-end voice signal, an echo signal and an environmental noise.

The far-end voice signal x(n) is propagated in an echo path 100 through the speaker 101, and is picked up by the microphone 102, to form the echo signal. The self-adaptive filter 103 receives the far-end voice signal x(n) as a training signal to simulate the echo path 100, and cancels the echo signal in the receiving signal. In the self-adaptive filter 103, it can use a Variable Step Size Normalized Least Mean Square (VSS-NLMS) algorithm generally, and the order is usually selected as 512~1024.

The near-end voice signal may appear in the echo path (in a double-end communication), and the near-end voice signal has a bad effect on the self-adaptive filter 103, thus the voice signal detection portion 104 detects whether the near-end signal contains the near-end voice signal, hereby controlling the next work of the self-adaptive filter 103.

At the same time, the echo path 100 may change with user's movement. The path change detection portion 105 detects whether the echo path 100 changes. Once the path changes, it needs that the self-adaptive filter 103 is able to change with it fast. The path change detection portion 105 is also used for controlling the work of the self-adaptive filter 103. Because mutual influence exists between the double-end communication and the path change, the path change detection portion 105 sends a control signal 107 to control threshold updating of the voice signal detection portion 104 after the path changes.

Figure 2:
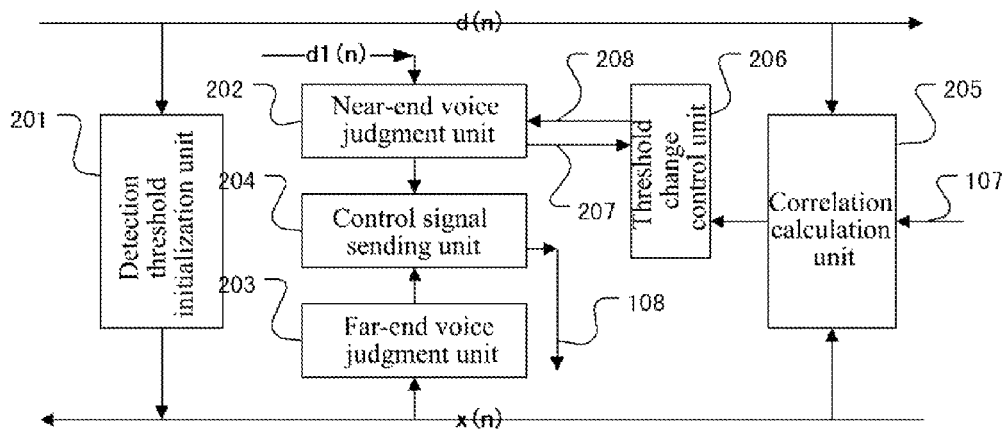
FIG. 2 is a structure diagram of a voice signal detection portion in an echo canceller of embodiment 1 of the present document.

FIG. 2 is a structure diagram of a voice signal detection portion 104 in the echo canceller of the present embodiment, supposing that the second self-adaptive filter is adopted to simulate the first L coefficients of the echo path 100. The order of the second self-adaptive filter is L (which generally is 32~128), and d1(n) is obtained by a convolution of the first L orders of coefficients of the self-adaptive filter 103 and the far-end voice signal x(n), that is, the desired signal of the second self-adaptive filter.

A detection threshold initialization unit 201 stores the near-end signal while the communication link is established, and estimates the voice detection threshold according to a formula 1 and a formula 2, wherein the voice detection threshold is as an initial value of a near-end voice detection threshold of a near-end voice judgment unit 202 and an initial value of a far-end voice detection threshold of a far-end voice judgment unit 203.

$$E(v^2) = \frac{1}{N}\sum_{i=1}^{N} v(n)^2 \quad \text{[Formula 1]}$$

The initialization of the voice detection threshold initialized is estimated:

$$Threshold0 = K \cdot E(v^2) \quad \text{[Formula 2]}$$

wherein, Threshold0 is the initial value of the voice detection threshold, v(n) is the near-end signal stored by the detection threshold initialization unit 201, N is a signal length and generally is 1000~3000, and K is a voice threshold estimation gain and generally is 3~5.

The near-end voice judgment unit 202 is used for judging whether there is a near-end voice signal, and it performs the initial judgment according to formula 3. Due to misjudgment of the near-end voice on each point which is caused by unbalanced voice loudnesses, the near-end voice judgment unit 202, according to the characteristic that the voice points appear continuously, adds the point into a sliding window after judging whether there is the near-end voice in a single point, and judges that the near-end voice exists when the near-end voice points in the window exceed a threshold value, that is, it uses formula 4 to perform the final judgment. The far-end signal judgment unit 203 is the same as the above-mentioned work method, but it performs the initial judgment according to formula 5 and uses formula 6 to perform the final judgment.

The near-end voice judgment as:

$$\text{a counter } C(n) \text{ is added by 1 when } d1(n)^2 > \text{Threshold} \quad \text{[Formula 3]}$$

$$SUMC = \sum_{i=M}^{M+N_1-1} C(i) > \text{Threshold2} \quad \text{[Formula 4]}$$

The far-end voice judgment as:

$$\text{a counter } D(n) \text{ is added by 1 when } x(n)^2 > \text{Threshold1} \quad \text{[Formula 5]}$$

$$SUMD = \sum_{i=M}^{M+N_2-1} D(i) > \text{Threshold3} \quad \text{[Formula 6]}$$

wherein, Threshold is a first near-end voice detection threshold, Threshold2 is a second near-end voice detection threshold, Threshhold1 is a first far-end voice detection threshold, Threshold3 is a second far-end voice detection threshold, and Threshold=Threshold1=Threshold0 at an initial detection stage; $N_1$, $N_2$ is length of the sliding window and generally is 100~300, M=M+S, wherein M is a starting point of the sliding window and S is sliding length of the sliding window and generally is 50~150. The near-end voice detection threshold and the far-end voice detection threshold are generally set as a same value, i.e., Threshold=Threshold1, and Threshhold2=Threshold3.

The result of the voice judgment is input to a control signal sending unit 204 which sends a control signal 108 to control the self-adaptive filter 103 and the path change detection portion 105.

During a near-end communication or muting (the speaker does not product sound), because it does not need to perform the cancellation of the echo, the self-adaptive filter is closed at this moment;

During the double-end communication, it makes the self-adaptive filter be divergent, and the self-adaptive filter is locked at this moment; that is, the filter coefficient is not updated: w(n+1)=w(n);

When there is no above-mentioned status (that is, excluding the situations of the near-end communication, the muting and the double-end communication of the far-end communication, there is only the far-end voice at this moment, and additional noise may be added), the path change detection portion 105 performs the path change detection.

Because the echo path change may cause the uprush of the echo signals, it results in that there is no near-end voice signal while there are only the echo signals, but the near-end voice judgment unit 202 still judges that there is the near-end voice, and then it needs to judge whether the voice detection threshold is to be adjusted after the path changes.

The result of the path change detection is fed back by a control signal 107 to control a correlation calculation unit 205. If it is detected that there is the path change, then the correlation calculation unit 205 is started. The correlation calculation unit 205 calculates the correlation of the receiving signal d(n) and the far-end voice signal x(n); when the correlation is greater than a setting correlation comparison threshold, it is illustrated that there is no near-end voice signal at this moment, and if the detection result 207 of the near-end voice judgment unit 202 is that there is the near-end voice signal, then it is illustrated that the threshold is invalid; and a threshold change control unit 206 sends out a control signal 208 to change the near-end voice detection threshold at this moment. The updating of the threshold is provided by formula 7.

$$\text{when } r = \frac{E[d(n)x(n)]}{\sqrt{\delta_d^2 \delta_x^2}} > \text{Threshold5 \&\& } SUMC = \sum_{i=1}^{N_1} C(i) > \text{Threshold2,}$$ [Formula 7]

$$\text{Threshold} = G_1 \cdot E(d^2)$$

wherein, Threshold5 is a correlation comparison threshold and is generally set as 0.2~0.4; δ is a signal variance, $G_1$ is a voice threshold estimation gain and generally is 3~5.

Figure 3:
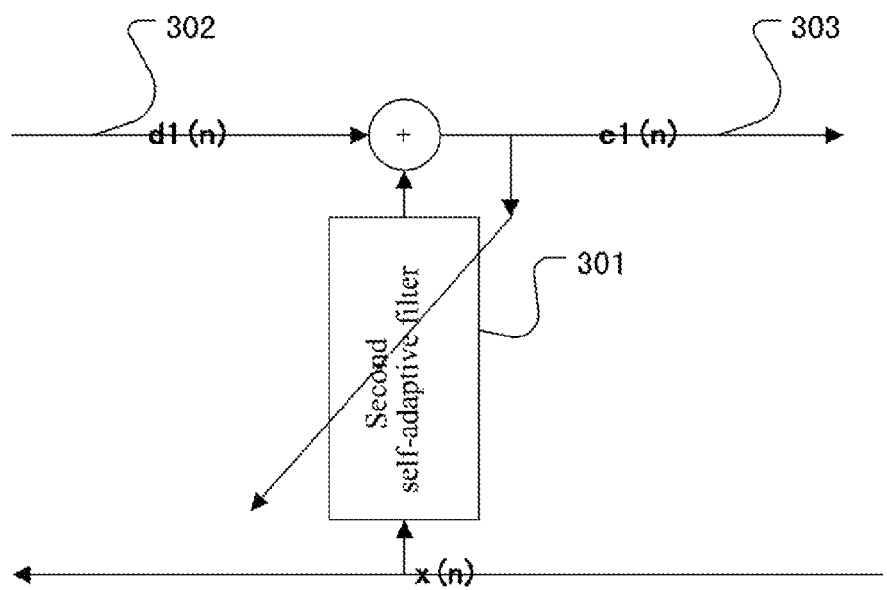
FIG. 3 is a structure diagram of a second self-adaptive filter in a path change detection portion in an echo canceller of embodiment 1 of the present document.
Figure 4:
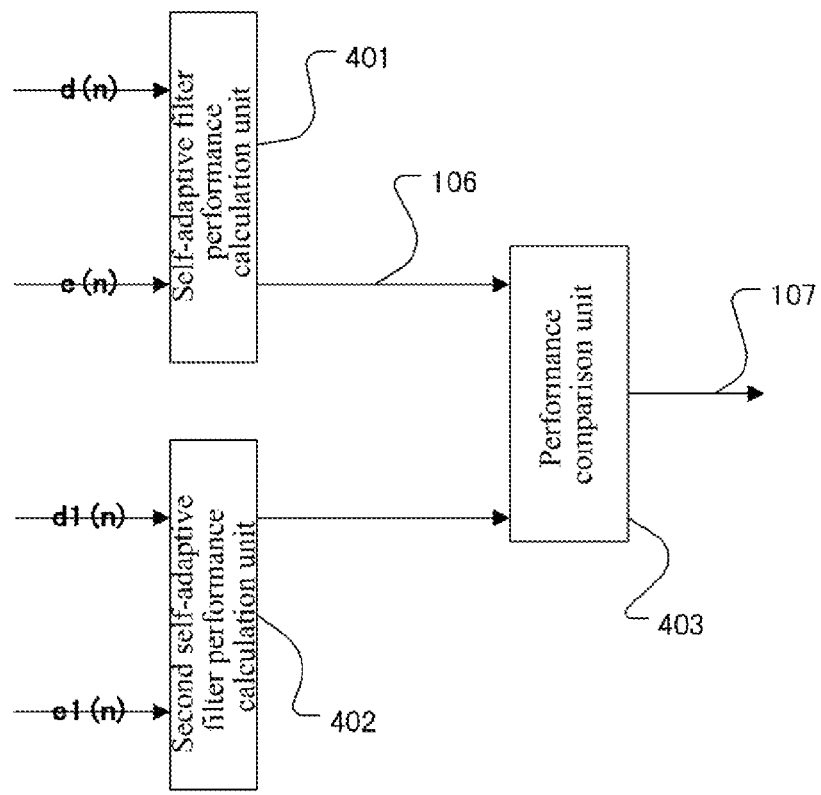
FIG. 4 is a structure diagram of a path change detection portion in an echo canceller of embodiment 1 of the present document.

The specific realization of the path change detection portion 105 is provided by FIG. 3 and FIG. 4. FIG. 3 is a structure diagram of the second self-adaptive filter, and FIG. 4 is a structure diagram of the path change detection portion 105.

As shown in FIG. 3, an input signal of the second self-adaptive filter 301 is the far-end voice signal x(n), the desired signal is d1 (n), and the error signal is e1(n). The second self-adaptive filter 301 simulates the first L coefficients of the echo path 100. Because its order is smaller than the self-adaptive filter, the convergence effect is good, it can track the changing of the path faster after the path changes, and it judges whether the path change occurs by comparing the performances of the self-adaptive filters.

As shown in FIG. 4, the performances of two filters are calculated respectively according to formula 8, the results are imported to a performance comparison unit 403, and whether a path mutation occurs is obtained through the judgment of formula 9.

$$ERLE = 10 \log_{10} \frac{\sum (d^2)}{\sum (e^2)}$$ [Formula 8]

wherein, d and e respectively represent the desired signal and the error signal of the calculated self-adaptive filter.

$$ERLE1 - ERLE2 > \text{Threshold4}$$ [Formula 9]

ERLE1 is a performance value of the second self-adaptive filter, ERLE2 is a performance value of the self-adaptive filter, and Threshold4 is a threshold of the path mutation and generally set as 15°20.

The control signal 107 is provided finally to control the self-adaptive filter 103 and the voice signal detection portion 104.

The self-adaptive filter 103 is restarted when the path mutation occurs, and the correlation calculation unit 205 of the voice signal detection portion 104 is opened at the same time.

When the path mutation does not occur, the Variable Step Size Normalized Least Mean Square (VSS-NLMS) algorithm is used to update the self-adaptive filter normally.

Figure 5:
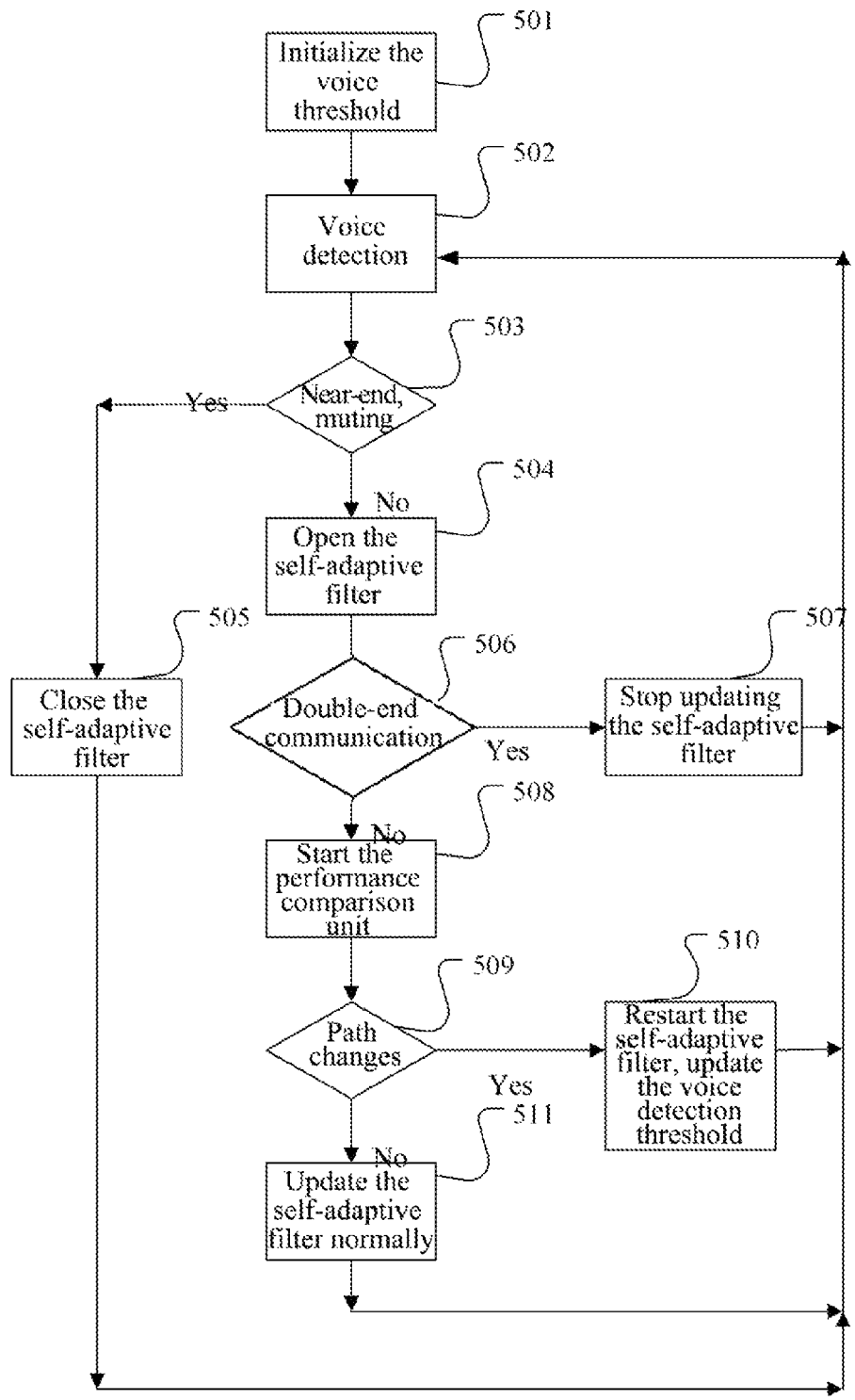
FIG. 5 is a flow chart of an echo canceller of embodiment 1 of the present document.

FIG. 5 is a flow of the echo cancellation method of embodiment 1 of the present embodiment, including the following steps:

in step 501: when the communication link is established, the detection threshold initialization unit 201 of the voice signal detection portion 104 stores the near-end signal, and obtains an initialization threshold of the voice detection through the calculation;

In step 502: the voice signal detection portion 104 detects the communication status;

In step 503: the voice signal detection portion 104 judges whether the communication status is the near-end communication or muting; if it is the near-end communication or muting, then step 505 is executed; otherwise, step 504 is executed;

In step 504: the self-adaptive filter 103 is opened, and step 506 is executed;

In step 505: the self-adaptive filter 103 is closed, and it returns back to step 502;

In step 506: it is judged whether it is the double-end communication; if yes, then step 507 is executed; otherwise, step 508 is executed;

In step 507: updating the self-adaptive filter 103 is stopped, and it returns back to step 502;

In step 508: the performance comparison unit 403 of the filter is started;

In step 509: the performance comparison unit 403 judges whether the path mutation occurs; if the path mutation occurs, then step 510 is executed; otherwise, step 511 is executed;

In step 510: the self-adaptive filter 103 is restarted, and the correlation calculation unit 205 is opened, and the voice detection threshold is updating, and later it returns back to step 502;

In step 511: the self-adaptive filter is updated normally according to the Variable Step Size algorithm, and later it returns back to step 502 to perform the voice signal detection again.

Embodiment 2

Figure 6:
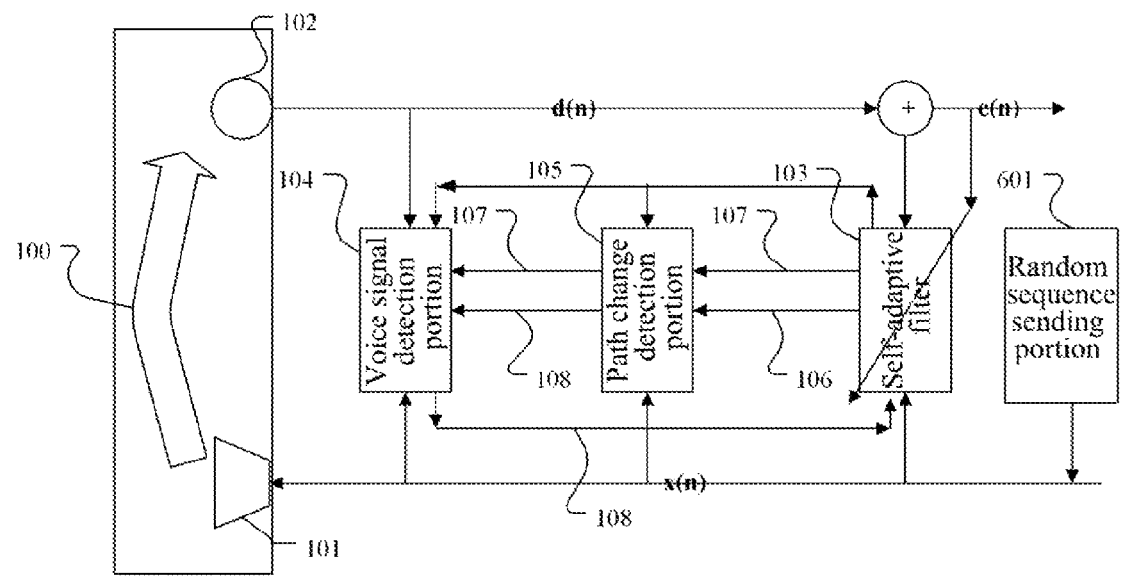
FIG. 6 is a structure diagram of an echo canceller of embodiment 2 of the present document.

In the above-mentioned embodiment 1, the detection threshold initialization unit 201 stores the near-end signal while the communication link is established, and estimates the voice detection threshold according to formula 1 and formula 2 as the initial threshold of the near-end voice judgment unit 202 and the far-end voice judgment unit 203. In the present embodiment, while the communication link is established, not only the detection threshold initialization unit 201 stores the near-end signal, but also a random sequence sending portion 601 sends a random sequence voluntarily, to perform initialization to the self-adaptive filter 103. FIG. 6 is the structure diagram of the echo canceller of the present embodiment, and usually the random sequence is selected as an M sequence.

The random sequence sent by the random sequence sending portion 601 is transmitted to the microphone 102 via the echo path 100 to form the echo signal so as to perform initialization to the self-adaptive filter 103, and the self-adaptive filter 103 uses the Variable Step Size Normalized Least Mean Square (VSS-NLMS) algorithm to perform the training, and the coefficient obtained from training are stored as the initial coefficient of the self-adaptive filter.

Thus, in the process of the echo suppression, the initial coefficient of the self-adaptive filter is not set as a 0 vector quantity but replaced by a preliminary simulation value of the echo path, thus making the convergence of the filter at the initialization stage be faster and the steady state error be less.

When the far-end voice signal is uncorrelated with the near-end voice signal, the double-end communication almost does not influence the updating of the coefficients of the self-adaptive filter, therefore, the random sequence that is uncorrelated with any voice signal is adopted by the present embodiment, so that it makes the self-adaptive filter itself have a certain robustness during the double-end communication. Meanwhile, the random sequence sent after the voice communication link is established can remind the user that the voice channel is already connected, which has very good practicability.

For the procedure of the echo canceller in the present embodiment, besides the step of sending the random sequence voluntarily when the link is established, other steps are exactly the same as embodiment 1, and no longer go into details here.

Embodiment 3

It is supposed in the embodiment 1 that the order of the second self-adaptive filter is L (generally is 32~128), d1 (n) is obtained by the convolution of the first L order coefficients of the self-adaptive filter 103 and the far-end signal x(n), that is, the desired signal of the second self-adaptive filter; and this signal is as the input and the near-end voice judgment unit 202 of the voice signal detection portion 104 judges whether there is the near-end voice signal in it; and the initial judgment is performed according to formula 3, and the final judgment is performed by using formula 4. In the present embodiment, the receiving signal d(n) of the self-adaptive filter is adopted as the input signal of the near-end voice judgment unit 202 of the voice signal detection portion 104. Meanwhile, because the voice signal has the transient steady characteristic, the voice signal is initially judged by adopting a frame structure and according to formula 10.

$$\text{The counter } C(n) \text{ is added by 1 when } \sum_{i=1}^{N_3} d(i)^2 > \text{Threshold} \quad \text{[Formula 10]}$$

wherein, d(n) is the receiving signal of the self-adaptive filter 103, and $N_3$ is a frame length and generally is 100~300.

Other structure and implementation steps are exactly the same as embodiment 1, and no longer go into details here.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each apparatus/module/unit in the above-mentioned embodiments can be implemented in the form of hardware, or in the form of software function module. The present document is not limit to any specific form of the combination of the hardware and software.

The above description is only the preferred embodiments of the present document and is not intended to limit the present document. For those skilled in the art, the present document can have various modifications and variations. Any of modifications, equivalents and/or improvements without departing from the spirit and essence of the present document should be embodied in the protection scope of the present document.

INDUSTRIAL APPLICABILITY

In sum, the present document can reach very good convergence effect at the initialization stage after adopting the above-mentioned technical scheme, and has a certain stability during the double-end communication; the random sequence has a prompt tone function and has very good practicability; it reduces the mutual influence between the double-end communication detection and the path mutation detection; and it improves the echo cancellation performance of an echo suppressor during the double-end communication and the path mutation. Therefore, the present document has very strong industrial practicability.

What we claim is:

1. An echo canceller, comprising: a self-adaptive filter, a voice signal detection portion and a path change detection portion, wherein, a far-end voice signal is propagated in an echo path through a speaker and is picked up by a microphone to form an echo signal, wherein, the self-adaptive filter is configured to receive the far-end voice signal as a training signal to simulate the echo path, and cancel the echo signal in a near-end signal;

the voice signal detection portion is configured to: detect a communication status, control the self-adaptive filter according to the communication status, and control startup of the path change detection portion according to the communication status; and the path change detection portion is configured to: detect whether a change occurs on the echo path, and control the self-adaptive filter according to whether the change occurs on the echo path;

wherein, an initial coefficient of the self-adaptive filter is 0;

wherein the voice signal detection portion comprises a detection threshold initialization unit, a near-end voice judgment unit, a far-end voice judgment unit and a control signal sending unit, wherein:

the detection threshold initialization unit is configured to: store the near-end signal when establishing the communication link, and estimate an initial value of a voice detection threshold by adopting the stored near-end signal, wherein the initial value is as an initial value of a near-end voice detection threshold of the near-end voice judgment unit and an initial value of a far-end voice detection threshold of the far-end voice judgment unit;

the near-end voice judgment unit is configured to: judge whether there is a near-end voice signal, and input a result of a near-end voice judging into the control signal sending unit;

the far-end voice judgment unit is configured to: judge whether there is a far-end voice signal, and input a result of a far-end voice judging into the control signal sending unit; and the control signal sending unit is configured to: send a control signal to control the self-adaptive filter and the path change detection portion after receiving the result of the near-end voice judging and the result of the far-end voice judging;

wherein, the control signal send unit is configured to send the control signal to control the self-adaptive filter and the path change detection portion according to the following way:

closing the self-adaptive filter during a near-end communication or muting;

locking the self-adaptive filter during a double-end communication, which is equivalent to not updating coefficients of the self-adaptive filter;

starting the path change detection portion during non near-end communication, non-muting, and non double-end communication;

wherein, the near-end voice judgment unit is configured to judge whether there is a near-end voice signal according to the following way:

adding 1 to a counter C(n) when d1 (n)²>Threshold, and judging that there is the near-end voice signal in the near-end signal when $$SUMC = \sum_{i=M}^{M+N_1-1} C(i) > Threshold2,$$

wherein, d1 (n) is a convolution of coefficients of the first L orders of the self-adaptive filter and the far-end voice signal, the Threshold is a first near-end voice detection threshold, and the Threshold2 is a second near-end voice detection threshold, $N_i$ is a length of a sliding window, M=M+S, wherein M is a starting point of the sliding window and S is a sliding length of the sliding window; or, adding 1 to the counter C(n) when $$\sum_{i=1}^{N_3} d(i)^2 > Threshold,$$

and judging that there is the near-end voice signal in the near-end signal when $$SUMC = \sum_{i=M}^{M+N_1-1} C(i) > Threshold2,$$

wherein, d(n) is the near-end signal, $N_3$ is a frame length, the Threshold is the first near-end voice detection threshold, and the Threshold2 is the second near-end voice detection threshold, $N_i$ is a length of the sliding window, M=M+S, wherein M is the starting point of the sliding window and S is the sliding length of the sliding window;

the far-end voice judgment unit is configured to judge whether there is a far-end voice signal according to the following way:

adding 1 to a counter D(n) when x(n)²>Threshold1, and judging that there is the far-end voice signal in the far-end signal when $$SUMD = \sum_{i=M}^{M+N_2-1} D(i) > Threshold3,$$

wherein, the Threshold1 is a first far-end voice detection threshold, the Threshold3 is a second far-end voice detection threshold, and $N_2$ is a length of a sliding window;

wherein, the first near-end voice detection threshold is equal to the first far-end voice detection threshold, and the second near-end voice detection threshold is equal to the second far-end voice detection threshold.

2. The echo canceller according to claim 1, further comprising a random sequence sending portion, wherein, the random sequence sending portion is configured to: send a random sequence to the speaker when establishing a communication link, wherein the random sequence passes through the echo path and the microphone to form the echo signal and the echo signal is transmitted to the self-adaptive filter, so as to perform initialization to the self-adaptive filter, wherein, the random sequence and the voice signal are uncorrelated; and the self-adaptive filter is configured to: train by adopting the echo signal formed by the random sequence, and store a coefficient obtained from training as an initial coefficient.

3. The echo canceller according to claim 1, wherein, the detection threshold initialization unit is configured to estimate the initial value of the voice detection threshold according to the following way:

calculating the initial value of the voice detection threshold by adopting Threshold0=K·E(v²), wherein, Threshold0 is the initial value of the voice detection threshold, K is a voice threshold estimation gain, $$E(v^2) = \frac{1}{N}\sum_{i=1}^{N} v(n)^2,$$

v(n) is the near-end signal, and N is a signal length.

4. The echo canceller according to claim 1, wherein, the voice signal detection portion further comprises a correlation calculation unit and a threshold change control unit, wherein:

the correlation calculation unit is configured to: receive a path change detection result sent by the path change detection portion, calculate a correlation of the near-end signal and the far-end voice signal when the echo path changes, determine that there is no near-end voice signal in the near-end signal when the correlation is greater than a correlation comparison threshold, and check a judgment result of the near-end voice judgment unit, and determine that the first near-end voice detection threshold is invalid when the judgment result is that the near-end voice signal exists; and the threshold change control unit is configured to: when the first near-end voice detection threshold is invalid, re-calculate the near-end voice detection threshold, and send a control signal to the near-end voice judgment unit to change the near-end voice detection threshold.

5. The echo canceller according to claim 4, wherein, the threshold change control unit is configured to re-calculate the near-end voice detection threshold according to the following way:
judging whether $$r = \frac{E[d(n)x(n)]}{\sqrt{\delta_d^2 \delta_x^2}} > Threshold5 \;\&\&\; SUMC$$

$$= \sum_{i=1}^{N_1} C(i) > Threshold2$$

exist; if yes, then determining Threshold=$G_1 \cdot E(d^2)$, wherein, the Threshold is the first near-end voice detection threshold, the Threshold5 is the correlation comparison threshold, δ is a signal variance, and $G_1$ is a voice threshold estimation gain.

6. The echo canceller according to claim 1, wherein, the path change detection portion comprises: a second self-adaptive filter, a self-adaptive filter performance calculation unit, a second self-adaptive filter performance calculation unit and a performance comparison unit, wherein:
an input signal of the second self-adaptive filter is the far-end voice signal, a desired signal is a value obtained by the convolution of the coefficients of the first L orders of the self-adaptive filter and the far-end voice signal, and an error signal is an error signal of the convolution, the second self-adaptive filter is configured to: simulate the first L coefficients of the echo path;
the self-adaptive filter performance calculation unit is configured to: calculate performance of the self-adaptive filter, and send a result to the performance comparison unit;
the second self-adaptive filter performance calculation unit is configured to: calculate performance of the second self-adaptive filter, and send a result to the performance comparison unit; and
the performance comparison unit is configured to: receive the results sent by the self-adaptive filter performance calculation unit and the second self-adaptive filter performance calculation unit, and then judge whether a path mutation occurs, restart the self-adaptive filter when determining that the path mutation occurs, and open a correlation calculation unit of the voice signal detection portion at the same time; and update the self-adaptive filter normally when determining that no path mutation occurs.

7. The echo canceller according to claim 6, wherein:
the self-adaptive filter performance calculation unit is configured to calculate the performance of the self-adaptive filter according to the following way: calculating the performance of the self-adaptive filter according to $$ERLE_2 = 10\log_{10} \frac{\sum d(n)^2}{\sum e(n)^2},$$

wherein, ERLE2 is a performance value of the self-adaptive filter, d(n) is the near-end signal, and e(n) is an error signal of the near-end signal;
the second self-adaptive filter performance calculation unit is configured to calculate the performance of the second self-adaptive filter according to the following way: calculating the performance of the second self-adaptive filter according to $$ERLE_1 = 10\log_{10} \frac{\sum d1(n)^2}{\sum e1(n)^2},$$

wherein, ERLE1 is a performance value of the second self-adaptive filter, d1(n) is the convolution of coefficients of the first L orders of the second self-adaptive filter and the far-end voice signal, and e1(n) is an error signal of the convolution; and
the performance comparison unit is configured to judge whether the path mutation occurs according to the following way: receiving the performance values calculated by and obtained from the self-adaptive filter performance calculation unit and the second self-adaptive filter performance calculation unit, and judging whether ERLE1-ERLE2>Threshold4 exists, wherein, Threshold4 is a path mutation threshold; if yes, then determining that the echo path mutates.

8. An echo cancellation method, comprising:
a far-end voice signal being propagated in an echo path through a speaker, and being picked up by a microphone to form an echo signal;
receiving, by a self-adaptive filter, the far-end voice signal as a training signal to simulate the echo path, and canceling the echo signal in a near-end signal;
detecting, by a voice signal detection portion, a communication status, controlling the self-adaptive filter according to the communication status, and controlling startup of a path change detection portion according to the communication status;
detecting, by the path change detection portion, whether a change occurs on the echo path, and controlling the self-adaptive filter according to whether the change occurs on the echo path;
setting an initial coefficient of the self-adaptive filter as 0;
wherein, the step of detecting, by a voice signal detection portion a communication status, controlling the self-adaptive filter according to the communication status, and controlling startup of a path change detection portion according to the communication status comprises:
storing, by the voice signal detection portion, the near-end signal when establishing the communication link, and estimating an initial value of a voice detection threshold by adopting the stored near-end signal, wherein the initial value is as an initial value of a near-end voice detection threshold and an initial value of a far-end voice detection threshold;
judging, by the voice signal detection portion, whether there is a near-end voice signal and whether there is a far-end voice signal, and sending a control signal to control the self-adaptive filter and the path change detection portion;
wherein, the step of the voice signal detection portion sending a control signal to control the self-adaptive filter and the path change detection portion comprises:
closing the self-adaptive filter during a near-end communication or muting;
locking the self-adaptive filter during a double-end communication, which is equivalent to not updating coefficients of the self-adaptive filter;

starting the path change detection portion during a non near-end communication, non-muting, and non double-end communication;

wherein, the step of the voice signal detection portion judging whether there is a near-end voice signal comprises:

adding 1 to a counter C(n) when d1 (n)$^2$>Threshold, and judging that there is the near-end voice signal in the near-end signal when $$SUMC = \sum_{i=M}^{M+N_1-1} C(i) > Threshold2,$$

wherein, d1 (n) is a convolution of coefficients of the first L orders of the self-adaptive filter and the far-end voice signal, the Threshold is a first near-end voice detection threshold, and the Threshold2 is a second near-end voice detection threshold, $N_1$ is a length of a sliding window, M=M+S, wherein M is a starting point of the sliding window and S is a sliding length of the sliding window;

or, adding 1 to the counter C(n) when $$\sum_{i=1}^{N_3} d(i)^2 > Threshold,$$

and judging that there is the near-end voice signal in the near-end signal when $$SUMC = \sum_{i=M}^{M+N_1-1} C(i) > Threshold2,$$

wherein, d(n) is the near-end signal, $N_3$ is a frame length, the Threshold is the first near-end voice detection threshold, and the Threshold2 is the second near-end voice detection threshold, $N_1$ is a length of the sliding window, M=M+S, wherein M is the starting point of the sliding window and S is the sliding length of the sliding window;

the step of the voice signal detection portion judging whether there is a far-end voice signal comprises: adding 1 to a counter D(n) when x(n)$^2$>Threshold1, and judging that there is the far-end voice signal in the far-end signal when $$SUMD = \sum_{i=M}^{M+N_2-1} D(i) > Threshold3,$$

wherein, the, Threshold1 is a first far-end voice detection threshold, the Threshold3 is a second far-end voice detection threshold, and $N_2$ is a length of a sliding window;

wherein, the first near-end voice detection threshold is equal to the first far-end voice detection threshold, and the second near-end voice detection threshold is equal to the second far-end voice detection threshold.

9. The echo cancellation method according to claim 8, further comprising:

sending, by a random sequence sending portion, a random sequence to the speaker when establishing a communication link, wherein the random sequence passes through the echo path and the microphone to form the echo signal and the echo signal is transmitted to the self-adaptive filter, so as to perform initialization to the self-adaptive filter; and performing, by the self-adaptive filter, training by adopting the echo signal formed by the random sequence, and storing a coefficient obtained from the training as an initial coefficient.

10. The echo cancellation method according to claim 8, wherein, the step of the voice signal detection portion estimating an initial value of a voice detection threshold by adopting the stored near-end signal comprises:

calculating, by the voice signal detection portion, the initial value of the voice detection threshold by adopting Threshold0=K·E(v$^2$), wherein, Threshold0 is the initial value of the voice detection threshold, K is a voice threshold estimation gain, $$E(v^2) = \frac{1}{N}\sum_{i=1}^{N} v(n)^2,$$

v(n) is the near-end signal, and N is a signal length.

11. The echo cancellation method according to claim 8, further comprising:

the voice signal detection portion receiving a path change detection result sent by the path change detection portion, calculating a correlation of the near-end signal and the far-end voice signal when the echo path changes, determining that there is no near-end voice signal in the near-end signal when the correlation is greater than a correlation comparison threshold, and checking a judgment result of whether there is a near-end voice signal, and determining that the first near-end voice detection threshold is invalid when the judgment result is that the near-end voice signal exists; and when the first near-end voice detection threshold is invalid, the voice signal detection portion re-calculating the near-end voice detection threshold, and sending a control signal to change the near-end voice detection threshold.

12. The echo cancellation method according to claim 11, wherein, the step of re-calculating the near-end voice detection threshold comprises:

judging whether $$r = \frac{E[d(n)x(n)]}{\sqrt{\delta_d^2 \delta_x^2}} > Threshold5 \,\&\&\, SUMC$$

$$= \sum_{i=1}^{N_1} C(i) > Threshold2$$

exist; if yes, then determining Threshold=$G_1$·E(d$^2$), wherein, the Threshold is the first near-end voice detection threshold, the Threshold5 is the correlation comparison threshold, δ is a signal variance, and $G_1$ is a voice threshold estimation gain.

13. The echo cancellation method according to claim 8, further comprising:

taking the far-end voice signal as an input signal of the second self-adaptive filter, taking a value obtained by the convolution of the coefficients of the first L orders of the self-adaptive filter and the far-end voice signal as a desired signal of the second self-adaptive filter, and taking an error signal of the convolution as an error signal of the second self-adaptive filter, and the second self-adaptive filter simulating the first L coefficients of the echo path;

calculating performance of the self-adaptive filter and performance of the second self-adaptive filter, and judging whether a path mutation occurs, restarting the self-adaptive filter when determining that the path mutation occurs, and starting a correlation calculation at the same time; and updating the self-adaptive filter normally when determining that no path mutation occurs.

14. The echo cancellation method according to claim 13, wherein:

the step of calculating the performance of the self-adaptive filter comprises: calculating the performance of the self-adaptive filter according to $$ERLE_2 = 10\log_{10}\frac{\sum d(n)^2}{\sum e(n)^2},$$

wherein, ERLE2 is a performance value of the self-adaptive filter, d(n) is the near-end signal, and e(n) is an error signal of the near-end signal;

the step of calculating the performance of the second self-adaptive filter comprises:

calculating the performance of the second self-adaptive filter according to $$ERLE_1 = 10\log_{10}\frac{\sum d1(n)^2}{\sum e1(n)^2},$$

wherein, ERLE1 is a performance value of the second self-adaptive filter, d1 (n) is the convolution of coefficients of the first L orders of the second self-adaptive filter and the far-end voice signal, and e1 (n) is an error signal of the convolution; and the step of judging whether the path mutation occurs comprises: judging whether ERLE1-ERLE2>Threshold4 exists, wherein, Threshold4 is a path mutation threshold; if yes, then determining that the echo path mutates.

* * * * *